March 27, 1928.
H. G. FRANCIS
BOLT HEAD
Filed Feb. 26, 1925
1,664,207
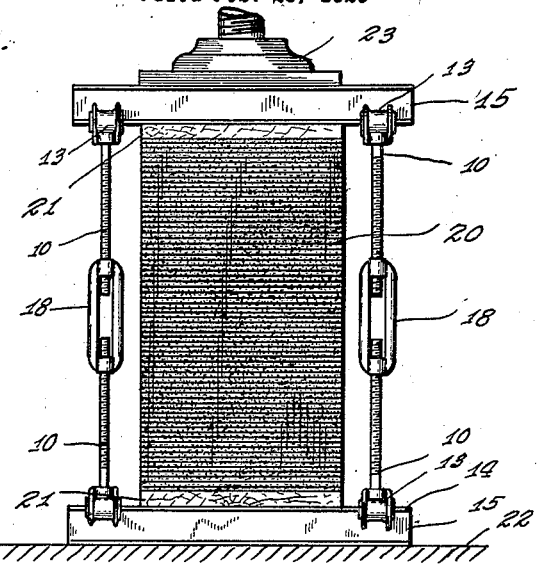
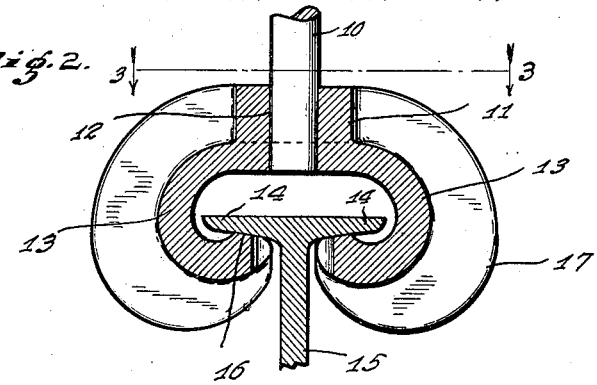
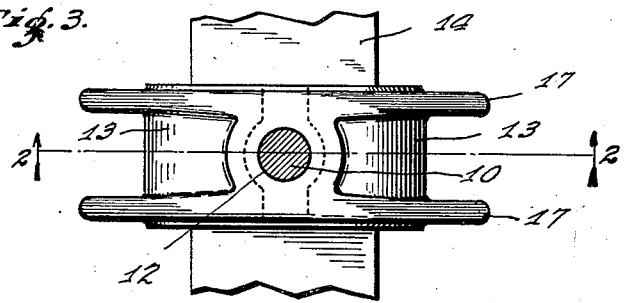
INVENTOR.
HARRY G. FRANCIS,
BY
ATTORNEY.

Patented Mar. 27, 1928.

1,664,207

UNITED STATES PATENT OFFICE.

HARRY G. FRANCIS, OF RUSHVILLE, INDIANA.

BOLT HEAD.

Application filed February 26, 1925. Serial No. 11,641.

It is the object of my invention to produce a bolt head for gripping the base of an I-beam or similar structural steel member and exerting a pull thereon perpendicular with such base without material danger of deforming the base.

My invention is especially adapted for use in presses, such as veneer presses, in which the material to be compressed is located between two sets of I-beams, which overhang at both ends beyond such material to receive the heads of turn-buckle bolts by which corresponding I-beams of the two sets may be held from separating, one of the sets of I-beams being arranged to lie flat on the press table while the other set co-operates with a compressing member or members. It is desirable that these I-beams should lie flat on the press table; and this is prevented if the flanges or bases of the I-beams are deformed by the action thereon of the heads of the turn-buckle bolts.

In carrying out my invention, I provide a bolt the head of which consists of a pair of arms projecting oppositely from the bolt shank and curving around inward toward each other beyond the bolt shank to embrace the two flanges of a base of an I-beam, on opposite sides of the central member of the beam; and to engage such flanges only at points spaced from the free edges of the flanges. I use two of these bolts together, with a turn-buckle to form a turn-buckle bolt; and two such turn-buckle bolts, (or pairs of bolts,) in co-operation with two I-beams with the ends of which the turn-buckle bolts co-operate, to provide a clamping unit for the material which is compressed in the press.

The accompanying drawing illustrates my invention: Fig. 1 is a fragmental end elevation of a veneer press having turn-buckle bolts co-operating with I-beams in accordance with my invention; Fig. 2 is an axial sectional view, substantially on the line 2—2 of Fig. 3, through the head end of a bolt embodying my invention, showing it in its working relation to an I-beam; and Fig. 3 is a section on the line 3—3 of Fig. 2.

The bolt has a shank 10 provided with a head 11; the head conveniently being made as a separate piece from the shank, such as a malleable casting, and attached to the shank in any suitable manner, as by having an axial hole 12 in which the shank 10 is inserted and fastened. The head 10 has two arms 13, which extend oppositely outward away from the head-body, and then curve toward each other on the opposite side of the head from which the shank 10 projects, so that they may reach around the flanges 14 of an I-beam 15, as is clear from Fig. 2. The arms 13 not only swing around the edges of the flanges 14 of the I-beam, but turn backward slightly toward the head-body 11, or toward the shank 10, so that they terminate in toes 16 which engage the flanges 14 of the I-beam only at points removed from the edges of said flanges and close to the web of the I-beam. This is clear from Fig. 2. In this way, the edges of the flanges 14 are substantially free from distorting pressure, and so the flange 14 considered as a unit will remain flat in spite of the pressure exerted by the bolt.

For strengthening purposes, the arms 13 may be provided with any desired number of strengthening ribs 17.

In ordinary use, the bolts are associated in pairs, to form a single turn-buckle bolt. To this end, the shanks 10 are threaded, to receive a turn-buckle 18 which co-operates with the threaded shanks of two bolts, as is clear from Fig. 1. Two or more turn-buckle blots, each comprising a turn-buckle 18 and an associated pair of bolts, co-operate with the projecting ends of a pair of I-beams 15, to form a generally rectangular clamp unit enclosing an open space. This rectangular clamping unit is assembled around the material to be clamped, such as a stack of veneer strips 20 assembled between two pressure boards 21. This clamping unit, of two I-beams and two or more turn-buckle bolts, is usually but one of any desired number of such clamping units, used in a press.

To make use of my bolts, the lower I-beams are laid on the table 22 of the press, the lower pressure board 21 is put on said I-beams, the veneer strips or other material to be compressed is put on such lower pressure board, the upper pressure board is put in place on the pile of veneer strips or other material, and the upper I-beams 15 are put in place on the upper pressure board. Then the pressure is applied to the material through the medium of the table 22 and the upper pressure head 23. This pressure can be applied by lowering the head 23 in the screw press shown or by raising the table 22 as in the common types of hydraulic presses. When the desired compression is obtained, the turn-buckle bolts are slipped on the projecting ends of the upper and lower I-beams, as is clear from Fig. 1, and the turn-buckles 18 are tightened to hold the upper and lower I-beams from separation. Then the table 22 and the head 23 are separated, but the compressed unit as a whole is kept from expansion by the I-beams 15 and their associated turn-buckle bolts. This compressed unit may be slid over the table 22, and stored and dried in any suitable manner; to permit the use of the press meanwhile for compressing other units of material in the same way.

By reason of having the arms 13 shaped as above pointed out, the flanges 14 of the I-beams are kept from becoming deformed, which lengthens the life of the I-beam as well as of the bolt heads 13; and, in addition, the I-beams 15 will all stay in shape so that they will lie flat on the table 22.

I claim as my invention:

1. A bolt for co-operating with an I-beam, comprising a shank, and a unitary head on said shank, said head having two arms which project on opposite sides of the shank and curve toward each other to provide a space for receiving the base flange of an I-beam set in the plane of said shank, said arm being provided with toes which engage the base flange of said I-beam at points removed from the edges of said base flange and being free from said edges so that the edges will not be distorted, the distance across the I-beam receiving space in the vicinity of said toes being greater than the thickness of said base flange where it is engaged by said toes.

2. A bolt of the character set forth in claim 1, with the addition that said arms have reinforcing ribs thereupon.

3. In combination, two I-beams, two turn-buckle bolts interconnecting said I-beams to provide therewith an enclosed clamping space, each of said turn-buckle bolts comprising a pair of bolts and a turn-buckle, and each bolt of each turn-buckle bolt having a head which has a pair of arms for curving around the base flange of the associated I-beam and engaging the innerface of such flange at points inward from the edges of said flange while leaving such edges and the outer face of said base flange free from such engagement.

In witness whereof, I have hereunto set my hand at Indianapolis, Indiana, this 21st day of February, A. D. one thousand nine hundred and twenty-five.

HARRY G. FRANCIS.